United States Patent
Sutton, Jr.

(10) Patent No.: US 9,676,104 B2
(45) Date of Patent: Jun. 13, 2017

(54) VARIABLE SPRING CONSTANT TORQUE COUPLER

(71) Applicant: Yaskawa America, Inc., Waukegan, IL (US)

(72) Inventor: George H. Sutton, Jr., Xenia, OH (US)

(73) Assignee: YASKAWA AMERICA, INC., Waukegan, IL (US)

(*) Notice: Subject to any disclaimer, the term of this patent is extended or adjusted under 35 U.S.C. 154(b) by 0 days.

(21) Appl. No.: 14/712,046

(22) Filed: May 14, 2015

(65) Prior Publication Data
US 2015/0330458 A1 Nov. 19, 2015

Related U.S. Application Data

(60) Provisional application No. 62/000,338, filed on May 19, 2014.

(51) Int. Cl.
*F16D 3/56* (2006.01)
*B25J 19/06* (2006.01)

(52) U.S. Cl.
CPC .............. *B25J 19/068* (2013.01); *F16D 3/56* (2013.01); *F16D 2300/18* (2013.01); *Y10T 464/20* (2015.01)

(58) Field of Classification Search
CPC ...... B25J 19/068; F16D 3/56; F16D 2300/18; Y10T 464/20
USPC .......... 464/23, 77, 81, 84, 100, 101; 29/428; 901/19
See application file for complete search history.

(56) References Cited

U.S. PATENT DOCUMENTS

| | | | | |
|---|---|---|---|---|
| 2,969,660 A * | 1/1961 | Dale | ................... | B25B 23/1405 464/100 |
| 3,013,413 A * | 12/1961 | Luning | ..................... | F16D 3/56 464/101 |
| 3,748,868 A * | 7/1973 | Poget | ........................ | F16D 3/56 |
| 6,109,134 A * | 8/2000 | Sudau | ............... | F16F 15/13157 464/84 X |
| 8,951,129 B2 * | 2/2015 | Choi | ......................... | F16D 3/16 464/81 X |
| 9,157,485 B2 * | 10/2015 | Pane | .................... | B25J 17/0241 |
| 9,328,774 B1 * | 5/2016 | Shaw | ....................... | F16D 3/56 |
| 2016/0082603 A1 | 3/2016 | Schimmels et al. | | |

* cited by examiner

*Primary Examiner* — Gregory Binda
(74) *Attorney, Agent, or Firm* — Mori & Ward, LLP (57) ABSTRACT

A torque coupler includes a first torque plate having a first slot extending in a radial direction, and a second torque plate having a second slot extending in the radial direction. The second slot has a side formed of a flexible beam. A cam plate is pivotable about an axis, and has a cam slot having a first portion at a first radial distance from the axis and a second portion at a second radial distance, where the second distance is greater than the first distance. A torque transfer member is slidably received within the first slot, the second slot, and the cam slot. The transfer member transferring torque between the first and second torque plates. A drive device rotates the cam plate about the axis, which causes the first cam slot to radially slide the transfer member along the flexible beam.

33 Claims, 7 Drawing Sheets

VARIABLE SPRING CONSTANT TORQUE COUPLER

CROSS-REFERENCE TO RELATED APPLICATION

The present application claims priority to U.S. Prov. Application No. 62/000,338, filed on May 19, 2014, the entire contents of which are herein incorporated by reference.

BACKGROUND OF THE INVENTION

Field of the Invention

The present invention relates to a torque coupler having a variable spring constant.

Discussion of the Background

In the field of robotics, robots are needed that can operate efficiently and safely under a variety of conditions/environments. For example, in certain operational conditions in which there is minimal risk of the robot colliding with other items, the robot can operate using high speed without taking precautions for collisions. Alternatively, in certain operational conditions, for example in which the robot in collaboration with workers or other robots or in confined spaces, precautions much be taken in order to ensure the safety of the workers, and to prevent damage to the robot or other robots/structures.

In high speed operational conditions, it can be advantageous to a torque coupler that can act as a series elastic actuator (SEA) with a high stiffness value that can prevent oscillations from occurring during changes in acceleration of members of the robot. In certain operational conditions, such as in collaborative settings in which the robot is working with a worker, the use of an SEA with low stiffness values can improve the safety of the workers. Additionally, in certain operational conditions, such as in force control modes of operation, it can be advantageous to enable a robot controller to hold a specified position under variable process loads. Accordingly, there is a need for a torque coupler that can advantageously provide a variable spring constant within the SEA. Additionally, in certain operational conditions, such as in force control modes of operation, it can be advantageous for the torque coupler to monitor torque transmission. Additionally, in certain operational conditions, such as holding a specified position or path under variable process loads, it can be advantageous for the torque coupler to monitor deflection or twist.

SUMMARY OF THE INVENTION

Embodiments of the present invention advantageously provide a torque coupler for coupling a first member and a second member. The torque coupler includes a first torque plate configured to attach to the first member and having a first slot extending in a radial direction, and a second torque plate configured to attach to the second member and having a second slot extending in the radial direction. The second slot has a first side formed of a first flexible beam. The torque coupler also includes a cam plate pivotable about an axis. The cam plate has a first cam slot having a first portion provided at a first radial distance from the axis and a second portion provided at a second radial distance from the axis, where the second distance is greater than the first distance. The torque coupler also includes a first torque transfer member being slidably received within the first slot, the second slot, and the first cam slot. The first torque transfer member is configured to transfer torque between the first torque plate and the second torque plate. The torque coupler further includes a drive device configured to rotate the cam plate about the axis, where rotation of the cam plate about the axis causes the first cam slot to radially slide the first torque transfer member along the first flexible beam.

Embodiments are provided that advantageously include a sensor configured to measure relative rotation of the first torque plate and the second torque plate about the axis. Embodiments are also provided that advantageously include a sensor configured to determine torque transmission between the first torque plate and the second torque plate. Further embodiments are provided that include a strain gage provided on the first flexible beam to measure strain on the first flexible beam due to torque transferred between the first torque plate and the second torque plate by the torque transfer member.

Embodiments of the present invention also advantageously provide a torque coupler for coupling a first member and a second member. The torque coupler includes a first torque plate configured to attach to the first member and having a plurality of first slots extending in radial directions, and a second torque plate configured to attach to the second member and having a plurality of second slots extending in directions corresponding to the plurality of first slots. The plurality of second slots each have at least one side formed of a flexible beam. The torque coupler also includes a cam plate pivotable about an axis. The cam plate has a plurality of cam slots each extending outwardly from the axis from a first location at a first radial distance to a second location at a second radial distance from the axis. The torque coupler also includes a plurality of torque transfer members each being slidably received within a respective first slot of the plurality of first slots, a respective second slot of the plurality of second slots, and a respective cam slot of the plurality of cam slots. The plurality of torque transfer members is configured to transfer torque between the first torque plate and the second torque plate. The torque coupler further includes a drive device configured to rotate the cam plate about the axis, where rotation of the cam plate about the axis causes the plurality of cam slots to radially slide the torque transfer members along respective flexible beams.

Embodiments of the present invention further advantageously provide a method that includes coupling a first member and a second member using a torque coupler. The torque coupler includes a first torque plate attached to the first member and having a plurality of first slots extending in radial directions, and a second torque plate attached to the second member and having a plurality of second slots extending in directions corresponding to the plurality of first slots. The plurality of second slots each have at least one side formed of a flexible beam. The torque coupler also includes a cam plate pivotable about an axis. The cam plate has a plurality of cam slots each extending outwardly from the axis from a first location at a first radial distance to a second location at a second radial distance from the axis. The torque coupler further includes a plurality of torque transfer members each being slidably received within a respective first slot of the plurality of first slots, a respective second slot of the plurality of second slots, and a respective cam slot of the plurality of cam slots. The plurality of torque transfer members is configured to transfer torque between the first torque plate and the second torque plate. The method further includes driving the cam plate in rotation about the axis to cause the plurality of cam slots to radially slide the torque transfer members along respective first flexible beams to vary a stiffness value of the torque coupler when transferring torque between the first torque plate and the second torque plate.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 1:
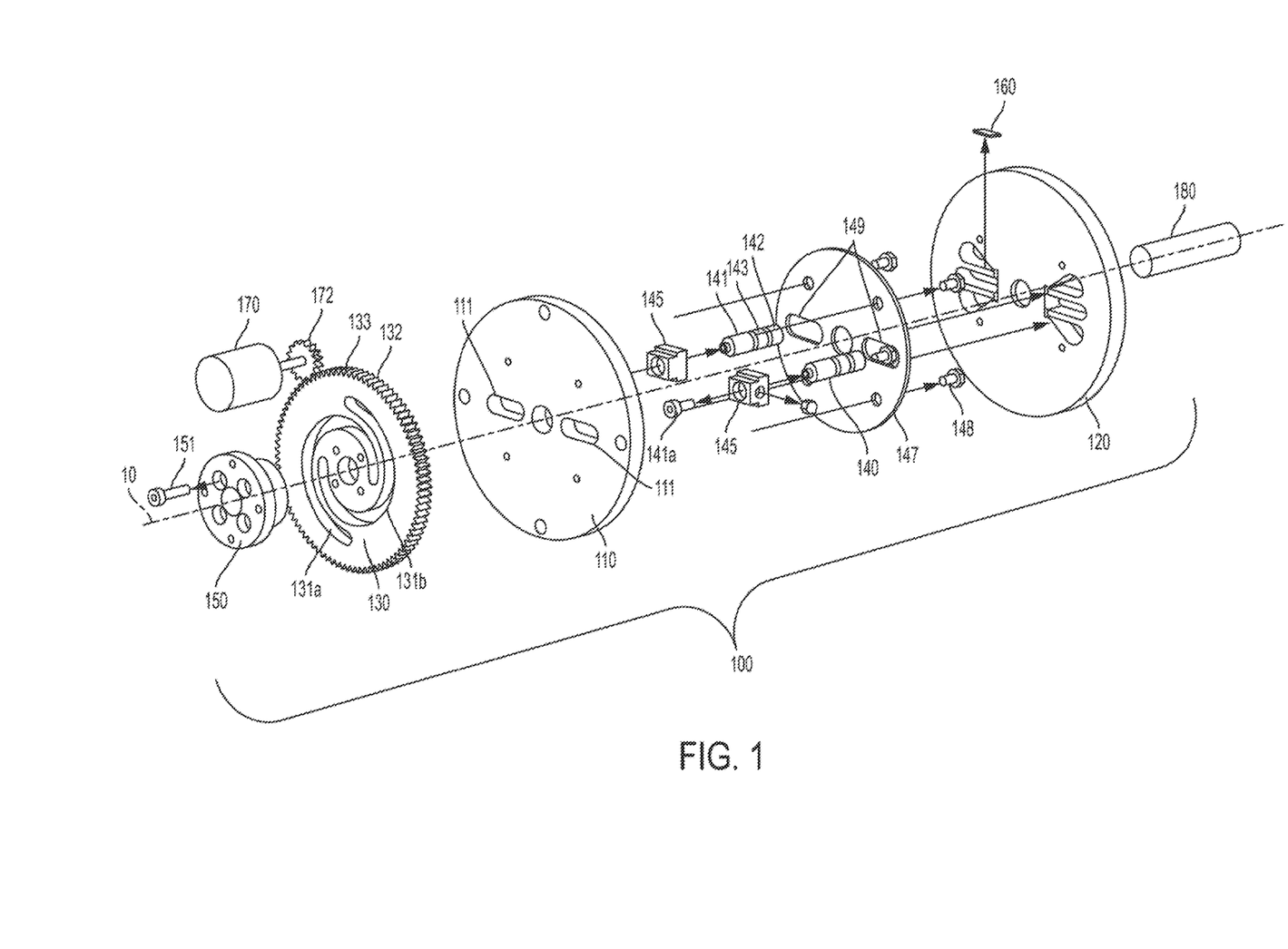
FIG. 1 is a front, right, isometric, exploded view of a torque coupler according to an embodiment shown and described herein.

FIG. 1 depicts a front, right, isometric, exploded view of a torque coupler 100 according to an embodiment shown and described herein. The torque coupler 100 generally provides a variable torsional spring constant/stiffness value. The variable torsional spring constant/stiffness can be controlled via a drive device such as a servo motor or other drive device. The torque coupler can be used to couple a first member to a second member, for example, such as linking together members within a robot. In some embodiments, the torque coupler 100 can have a compact or cylindrical design, where the torque coupler 100 can be deployed within a robot device (not shown).

Referring to FIGS. 1-4C, an embodiment of the torque coupler 100 is shown that includes a rigid torque plate (or a first torque plate) 110, a variable torque plate (or a second torque plate) 120, a torque pin cam plate (or cam plate) 130, and a plurality of torque transfer pins (or torque transfer members) 140, and a drive device 170. An axial drive coupler 150 is also provided in order to allow for connection to an alternative drive device, if so desired. The torque coupler 100 has an axis 10.

The torque coupler 100 can be used to couple a first member to a second member, for example, such as linking together members within a robot. Thus, the rigid torque plate 110 can be rigidly attached or connected to the first member, for example, by bolting, welding, etc., the rigid torque plate 110 to the first member. Similarly, the variable torque plate 120 can be rigidly attached or connected to the second member, for example, by bolting, welding, etc., the variable torque plate 120 to the second member. Thus, the torque coupler 100 can be provided as a series elastic actuator linking the first member to the second member.

In the embodiment of FIGS. 1-4C, the rigid torque plate 110 is located between the variable torque plate 120 and the torque pin cam plate 130 when assembled. Alternatively, in an embodiment of a torque coupler 200 shown in of FIGS. 6-8, a torque pin cam plate 230 is located between a rigid torque plate 210 and a variable torque plate 220 when assembled. In some embodiments, the torque coupler can be configured to allow angular deflections between the rigid torque plate and the variable torque plate of up to 5 degrees. Alternatively, the torque coupler 100 can be configured to allow such angular deflections of greater than 5 degrees.

In some embodiments, the torque coupler can include one or more of strain gages. For example, the torque coupler 100 shown in FIG. 1 includes strain gages 160 provided on the variable torque plate 120. Also, the torque coupler 200 shown in FIG. 6 includes a plurality of strain gages 260 that can be provided at various location on or in the variable torque plate 220.

In the embodiment shown in FIGS. 1-4C, the rigid torque plate 110, the variable torque plate 120, the torque pin cam plate 130, and the axial drive coupler 150 for cam plate 130 can be configured and/or aligned to be coaxial with each other along the axis 10 on shaft 180. It is noted that the variable torque plate 120, the torque pin cam plate 130, and the axial drive coupler 150 can pivot with respect to the rigid torque plate 110 about axis on the shaft 180. Alternatively, the rigid plate could be provided with cylindrical flanges extending axially along axis 10 toward the torque pin cam plate and toward the variable torque plate, and bearings can be provided on such cylindrical flanges in order to pivotally mount the torque pin cam plate and the variable torque plate to the rigid torque plate. Such an alternative configuration can allow for a through hole in the center of the device, for example, to allow for cables, wires, hoses, etc. to be extended through the torque coupler.

In the embodiment shown in FIGS. 1-4C, the plurality of torque transfer pins 140 each include a first pin end 141 including a cam follower bearing 141a, a second pin end 142 that is opposite the first pin end 141, and a center portion 143. The cam follower bearing 141a is a cam follower with a bearing incorporated therein that rotatably mounts the cam follower bearing to the remainder of the first pin end 141. The rigid torque plate 110 holds the plurality of torque transfer pins 140 in an axial direction parallel to the axis 10, while allowing the plurality of torque transfer pins 140 to move in a radial direction when the torque coupler 100 is being adjusted. The rigid torque plate 110 can comprise one or more radial travel paths (or first slots) 111. In some embodiments, the radial travel paths 111 can be channels that extend partially or entirely through the rigid torque plate 110 and extend radially outward from the longitudinal axis 10. In some embodiments, the torque transfer pins 140 can be located in the radial travel path 111 with a sliding block 145, which helps maintain the position and alignment of the torque transfer pins 140 (see FIG. 1). This embodiment can also include a sliding block containment plate 147 mounted to the rigid torque plate 110 by screws 148, which helps maintain proper location of the sliding block 145 in the radial travel path 111. The sliding block containment plate 147 has radially extending slots that allow the torque transfer pins 140 to extend therethrough, while retaining the sliding block 145 in the radial travel path 111. In the embodiment shown, the sliding blocks 145 are configured to receive the center 143 of one of the torque transfer pins 140.

In the embodiments shown, the variable torque plate 120 provides spring features of the torque coupler. The spring features can be formed such that at least one side of the slot(s) formed in the variable torque plate is formed of a flexible beam along one or more sides thereof, for example, along one or more of the sides thereof that extend in a substantially radial direction. For example, the spring features can be one or more cantilever beams, such as cantilever beams 121a, 121b, 126a, and 126b shown in FIG. 2, and cantilever beams 221a, 221b, 226a, and 226b shown in FIGS. 7A and 7B. In the embodiment shown in FIGS. 1 and 2, the second pin end 142 of the plurality of transfer pins 140 can be positioned within and move within a respective one of the slots 122a/122b along respective radial directions in order to varying the spring constant/stiffness of the torque coupler based on the transfer torque pins' position with respect and along the length of the flexible beam. Similarly, in the embodiment shown in FIGS. 7A and 7B, the plurality of transfer torque pins 240 can be positioned within and move within a respective one of the slots 222a/222b along respective radial directions in order to varying the spring constant/stiffness of the torque coupler based on the transfer torque pins' position with respect and along the length of the flexible beam.

Figure 2:
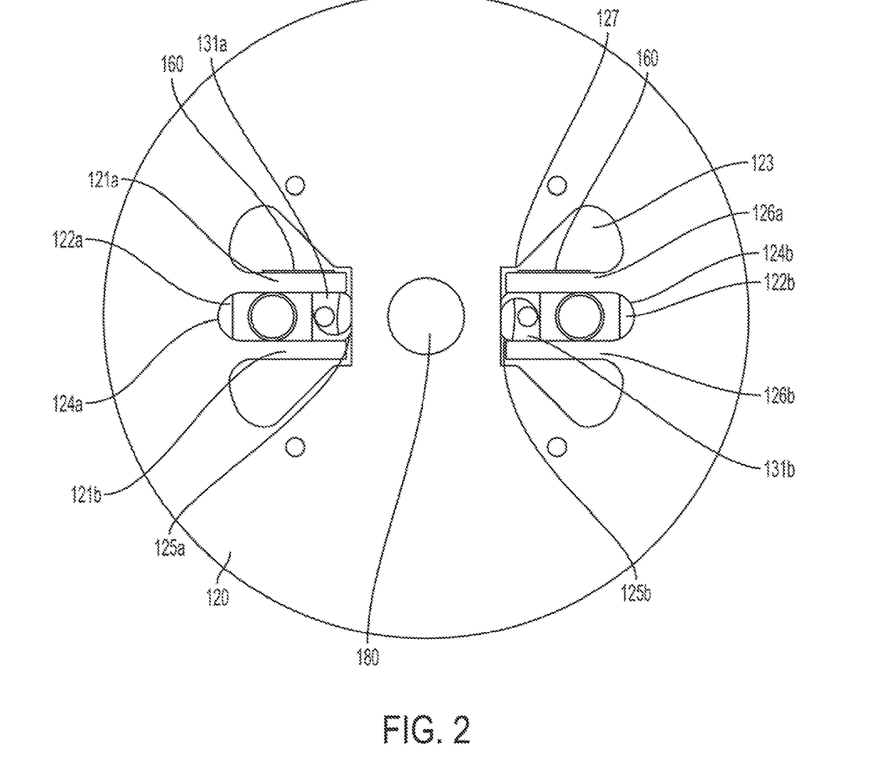
FIG. 2 is a rear elevational view of the torque coupler of FIG. 1.

In the embodiment shown in FIG. 2, the variable torque plate 120 can comprise a slot (or second slot) 122a disposed between the cantilever beams 121a and 121b, and a slot 122b disposed between the cantilever beams 126a and 126b. The slots 122a and 122b can disposed such that they extend radially from the longitudinal axis 10. The embodiment shown in FIGS. 2 and 3 optionally includes two sets of parallel cantilevered beams 121a/121b and 126a/126b, wherein each set of beams forms a separate slot disposed between the two beams of each set. By providing flexible members on both sides of the slot(s), the torque coupler can provide a variable spring constant/stiffness value in both a clockwise rotation direction and counterclockwise rotation direction about axis 10. In this embodiment, the slots each have an outer end 124a/124b and an inner end 125a/125b. In this embodiment, the outer ends 124a/124b are closed, and the inner ends 125a/125b are open, thus providing the cantilevered structure where the outer ends 124a/124b are fixed/anchored, and the inner ends 125a/125b are not fixed/not anchored. In some embodiments, the cantilever beams can have a reverse configuration with the outer ends of the slots (i.e., outer ends 124a/124b) being not fixed/not anchored and the inner ends of the slots (i.e., inner ends 125a/125b) being fixed/anchored. Thus, in some embodiments the cantilever beams can have its open end oriented towards a center of the variable torque plate 120 (as in FIGS. 2 and 6), or, alternatively, the cantilever beam can have its open end oriented away from the center of the variable torque plate 120.

In some embodiments, the variable torque plate 120 can be configured to leave an aperture 123 around each of the cantilever beams. In some embodiments, the aperture 123 can be formed to have a seat portion or stroke limiter 127 that limits the movement of the open end of the cantilever beams to prevent yield.

Figure 7A:
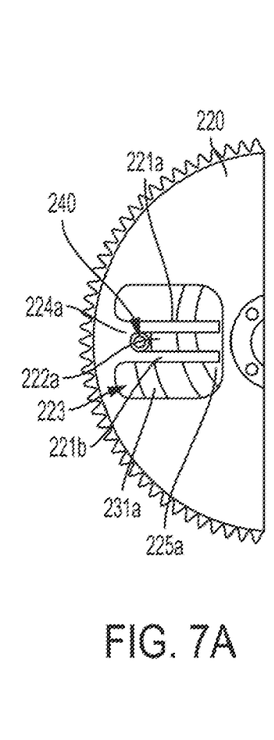
FIGS. 7A and 7B are partial views of the embodiment the torque coupler of FIG. 6, with FIG. 7A showing a left half of the torque coupler in a high stiffness configuration, and FIG. 7B showing a right half of the torque coupler in a low stiffness configuration.
Figure 7B:
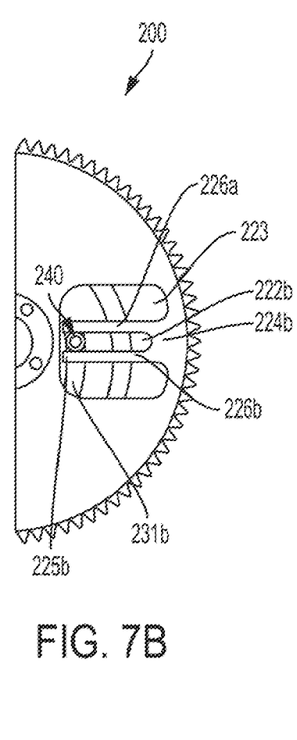

In the embodiment shown in FIGS. 7A and 7B, the variable torque plate 220 includes a slot 222a disposed between the cantilever beams 221a and 221b, and a slot 222b disposed between the cantilever beams 226a and 226b. In this embodiment, the slot 222a has an outer end 224a and an inner end 225a, and the slot 222b has an outer end 224b and an inner end 225b. In this embodiment, the outer ends 224a/224b are closed, and the inner ends 225a/225b are open. In this embodiment, the variable torque plate 220 is provided with apertures 223 around each of the cantilever beams.

Figure 5:
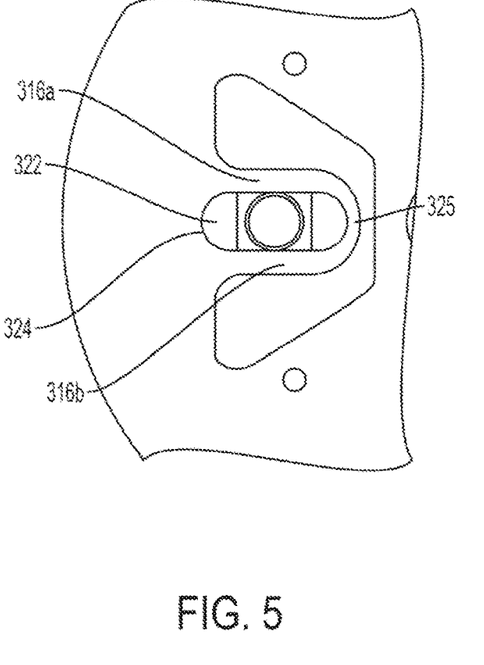
FIG. 5 is a rear, partial elevational view of a torque coupler according to an alternative embodiment shown and described herein.

Although the embodiments shown and described includes two sets of cantilever beams forming two respective slots, it is understood that other embodiments can include any number of cantilever beams, slots, completely closed slots, completely open slots, a variety of orientations for the slots and/or cantilever beams, no cantilever beams, channels, and/or any combinations thereof. For example, FIG. 5 depicts a partial view of a completely closed slot 322 having an outer end 324 that is closed, and an inner end 325 that is closed. Thus, the closed end of the slot 322 links the beams 321a and 321b together at the inner end 325, and therefore both beams 321a and 321b resist force placed on either of the beams 321a and 321b by the torque transfer pins. Additionally, it is noted that the cantilever beams can be provided with varying thicknesses along part or all of the length between the inner and outer ends in order to varying the spring characteristics along the length thereof. Also, it is noted that the type of material used to form the variable torque plate (e.g., metal, plastic, etc.) and the flexible beams can provide the desired spring characteristics/stiffness of the torque coupler.

Figure 4A:
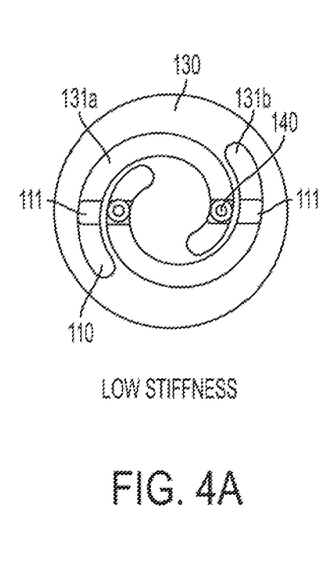
FIG. 4A is a front elevational view of a torque pin cam plate and torque transfer pins of the torque coupler of FIG. 1 in a low stiffness configuration.
Figure 4B:
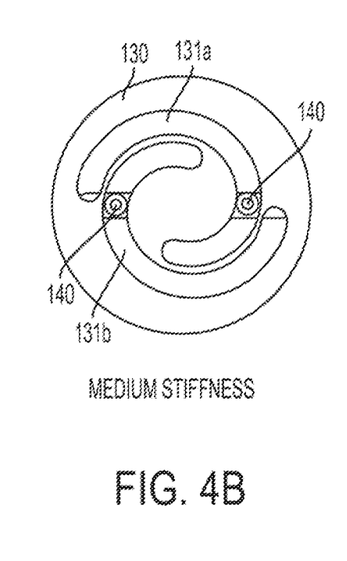
FIG. 4B is a front elevational view of a torque pin cam plate and torque transfer pins of the torque coupler of FIG. 1 in a medium stiffness configuration.
Figure 4C:
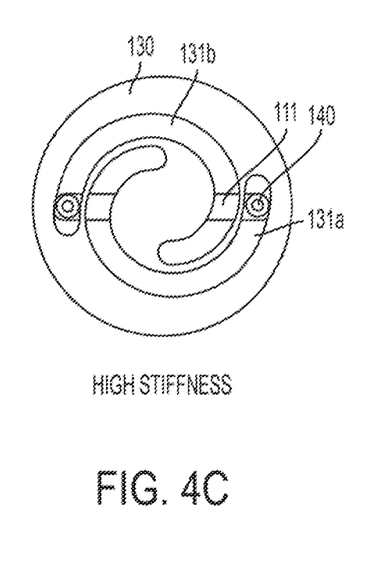
FIG. 4C is a front elevational view of a torque pin cam plate and torque transfer pins of the torque coupler of FIG. 1 in a high stiffness configuration.

The torque pin cam plate 130 in FIG. 1 generally controls the radial location of the torque transfer pins 140. The torque pin cam plate 130 includes one or more cam slot profiles (or cam slots) 131a/131b wherein a portion of the torque transfer pins 140, such as the cam follower bearings 141a, can rest and move within. The cam slots each extend/slant outwardly from the axis from a first location at a first radial distance to a second location at a second radial distance from the axis 10. In some embodiments, the cam slot profiles 131a/131b can follow a spiral configuration, such as Archimedean spiral, which provides a proportional ratio between the cam plate angle and torque transfer pin radial position. As shown in FIGS. 4A-4C, the cam slot profiles 131a/131b can be two offset substantially spiral shaped paths. In other embodiments, the cam slot profiles can be any two-dimensional continuous shape, wherein portions of the cam slot profiles have varying distances from the axis 10. In other embodiments, there can be more than one cam follower bearing resting or moving within a given cam slot profile.

The torque transfer pins 140 generally provide the mechanical link between the rigid torque plate 110 and the variable torque plate 120. In some embodiments, there can be a plurality of torque transfer pins 140. As shown in FIGS. 1-4C and 6-8, some embodiments can comprise two torque transfer pins 140. The torque transfer pins 140 can be of any size and shape so as to extend from the radial travel path 111 (e.g., first pin end 141 and cam follower bearing 141a disposed within the radial travel path 111) through the cam slot profiles 131a/131b of the torque pin cam plate 130 and into the slot 122a/122b (e.g., second pin end 142 disposed within the slot 122a/122b).

Figure 6:
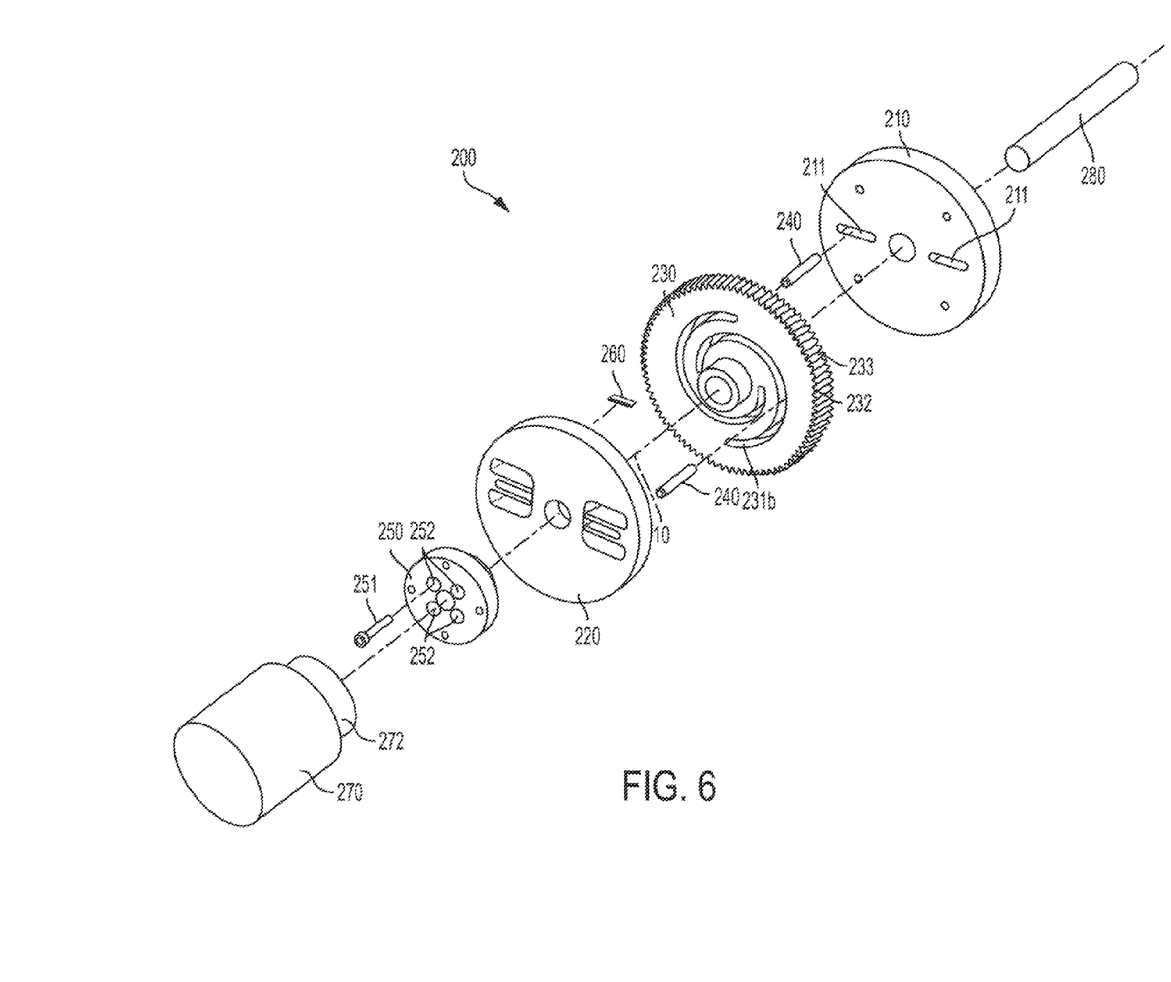
FIG. 6 is a front, right, isometric, exploded view of a torque coupler according to another embodiment shown and described herein.
Figure 8:
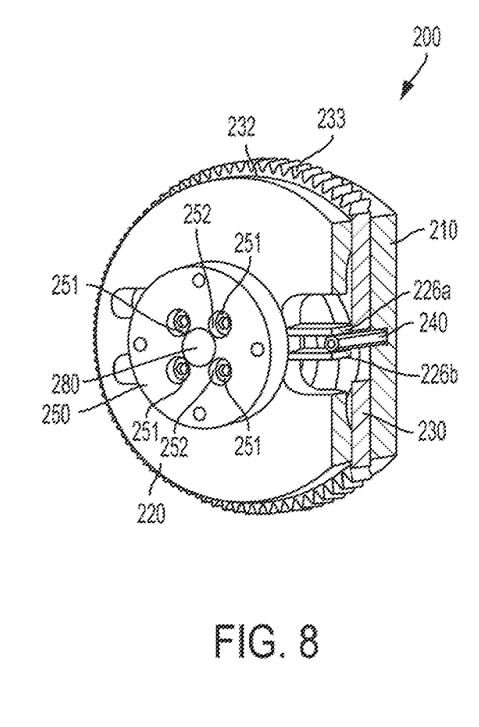
FIG. 8 is a front, right, isometric, cross-sectional, assembled view of the torque coupler of FIG. 6.

In the embodiment of FIGS. 1-4C, screws 151 are used to secure the axial drive coupler 150 to the torque pin cam plate 130. In the embodiment of FIGS. 6-8, screws 251 are used within holes 252 to secure the axial drive coupler 250 to the variable torque plate 220.

The axial drive coupler can be driven in rotation by a drive device such as a hydraulic system, servo motor, electric motor, mechanical systems (e.g., springs, linkages, chain/sprocket drive, etc.), solenoids, combinations thereof, or any other method of providing sufficient power to drive, move, and/or rotate the torque pin cam plate. For example, the embodiment shown in FIG. 6 includes a motor 270 as a drive device having an output shaft 272 that is connected to and configured to rotate the axial drive coupler 250.

Additionally or alternatively, the torque pin cam plate can be provided with an outer surface comprising gear teeth (e.g., cam plate 130 in FIG. 1 having outer surface 132 with gear teeth 133, and cam plate 230 in FIG. 6 having outer surface 232 with gear teeth 233). In such a configuration, the torque pin cam plate can be driven, moved, and/or rotated using an actuated gear rack to interlock with the gear teeth (i.e. gear teeth 133 or 233 on the outer surface 132 or 232, respectively). For example, the embodiment shown in FIG. 1 includes a motor 170 as a drive device that rotates gear 172 that interlocks with gear teeth 133 on the torque pin cam plate 130 to rotate the torque pin cam plate 130.

The torque coupler can be configured to easily incorporate sensors to measure the torque being transferred. One or more sensors can be provided that are configured to measure relative rotation of the variable torque plate and the rigid torque plate about the axis 10 for calculating torque transmission between the variable torque plate and the rigid torque plate. In the embodiments shown in FIGS. 1-4C, the sensors are strain gages 160 used to provide torque transmission feedback. The torque coupler 100 can comprise any number of strain gages 160. In some embodiments, the strain gages can be affixed to a face of the variable torque plate 120. Additionally or alternatively, the strain gages 160 can be mounted on, incorporated in, or otherwise affixed to the flexible member(s), as shown, for example, on cantilever beams 121a and 126a shown in FIGS. 2 and 3. When so mounted, incorporated, or affixed, the strain gages can provide feedback to a control system (not shown) regarding the deflection of the cantilever beam(s), and thus the torque transmission at the deflection.

The strain gages can be calibrated to directly measure torque transmission and calculate relative rotation between the variable torque plate and the rigid torque plate. Alternatively, a sensor can be mounted between the variable torque plate and the rigid torque plate that could directly measure rotation between the variable torque plate and the rigid torque plate and calculate torque transmission. Monitoring torque transmission can be advantageously used during force control modes of operation, while monitoring rotation between the variable torque plate and the rigid torque plate can be advantageously used to hold a specified position or path under variable process forces.

Referring collectively to FIGS. 1-4C, the torque coupler 100 can generally function in the following manner. The torque pin cam plate 130 can rotate about the axis 10 to vary the spring constant of the torque coupler, without the need for the rigid torque plate 110 and/or the variable torque plate 120 to move and/or rotate during varying of the spring constant. By rotating about the axis 10, the torque pin cam plate 130 moves the torque transfer pins 140 within the cam slot profiles 131a/131b as well as the radial travel paths 111. Similarly, referring collectively to FIGS. 6-8, the torque coupler 200 can generally function in the following manner. The torque pin cam plate 230 can rotate about the axis 10 to vary the spring constant of the torque coupler, without the need for the rigid torque plate 210 and/or the variable torque plate 220 to move and/or rotate during varying of the spring constant. By rotating about the axis 10, the torque pin cam plate 230 moves the torque transfer pins 240 within the cam slot profiles 231a/231b as well as the radial travel paths 211.

By way of illustration, in the embodiment shown in FIGS. 1-4C, the torque transfer pins 140 have a second pin end 142 constrained by a slots 122a/122b in the variable torque plate 120 and have a first pin end 141 (e.g., cam follower bearing 141a) constrained by the cam slot profiles 131a/131b. As such, when the torque pin cam plate 130 moves the torque transfer pins 140 within the cam slot profiles 131a/131b, the torque transfer pins will move in a radial direction within both the slots 122a/122b and the radial travel paths 111. The first and second pin ends 141, 142 can be solid (as is second pin end 142) or a cam follower bearing (as is cam follower bearing 141a), which is a cam follower incorporating a bearing to allow rotation of the cam follower relative to the remainder of the torque transfer pin. Alternatively, both the first and second pin ends 141, 142 can include cam follower bearings.

Figure 3:
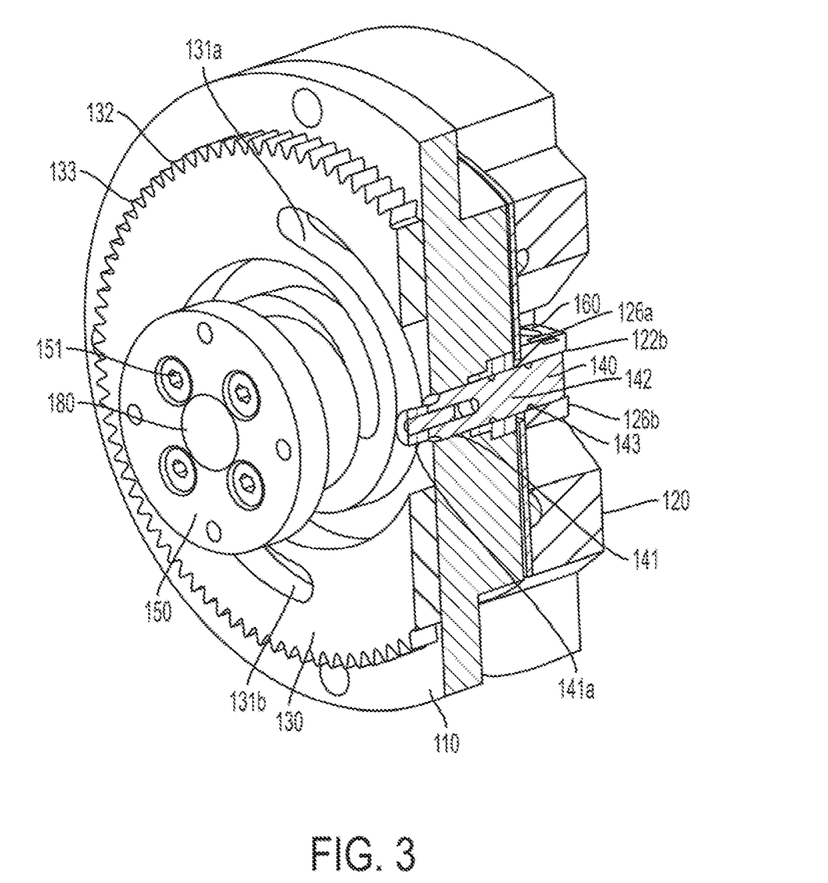
FIG. 3 is a front, right, isometric, cross-sectional, assembled view of the torque coupler of FIG. 1.

Torque is transmitted between the rigid torque plate 110 and the variable torque plate 120 via the torque transfer pins 140 (FIG. 3). The torque transfer pin 140 locations are controlled by the torque pin cam plate 130 via the cam slot profiles 131a/131b in a manner to control the stiffness of the torque coupler 100. In some embodiments, the torque pin cam plate 130 can provide a proportional relationship between the cam angle and the torque transfer pin 140 radial location as follows: the radial location of the torque transfer pin 140 is equal to the distance along the cam slot profile 131a/131b added to the product of the cam angle and a selected constant. In other words, radius R=distance D+angle θ×(constant C).

As such, the spring stiffness can vary depending on the radial location of the torque transfer pins 140 within the torque coupler 100. FIGS. 4A-4C depict varying stiffness configuration of the torque coupler of FIG. 1 including the variable torque plate 120 having flexible members configurations as shown. As shown in FIG. 4A, the torque transfer pins are moved to a radially inward position within the radial travel paths 111, cam profiles 131a/131b, and slots 122a/122b (e.g., within the torque coupler 100) and as such a low stiffness configuration. As shown in FIG. 4B, the torque transfer pins 140 are moved to a position radially outward from the low stiffness configuration shown in FIG. 4A within the radial travel paths 111, cam profiles 131a/131b, and slots 122a/122b (e.g., within the torque coupler 100) and as such a medium stiffness configuration. As shown in FIG. 4C, the torque transfer pins 140 are moved to a position radially outward from the medium stiffness configuration shown in FIG. 4B within the radial travel paths 111, cam profiles 131a/131b, and slots 122a/122b (e.g., within the torque coupler 100) and as such a high stiffness configuration.

It is noted that, in an embodiment that included a variable torque plate having second slots with cantilever beams with inner ends that are fixed/anchored, and outer ends that are not fixed/not anchored, then the orientation shown in FIG. 4A would represent a high stiffness configuration, the orientation shown in FIG. 4B would represent a medium stiffness configuration, and the orientation shown in FIG. 4C would represent a low stiffness configuration.

The embodiment shown in FIGS. 6-8 operates in a similar manner as the embodiment described above with respect to FIGS. 1-4C. In the embodiment of FIGS. 6-8, the torque transfer pins 240 have ends constrained by a slots 222a/222b in the variable torque plate 220 and opposite ends within radial travel paths 221, and a central portion constrained by the cam slot profiles 231a/231b. As such, when the torque pin cam plate 230 moves the torque transfer pins 240 within the cam slot profiles 231a/231b, the torque transfer pins will move in a radial direction within both the slots 222a/222b and the radial travel paths 211. FIGS. 7A and 7B are partial views of the torque coupler 200, with FIG. 7A showing a left half of the torque coupler 200 in a high stiffness configuration, and FIG. 7B showing a right half of the torque coupler 200 in a low stiffness configuration. FIG. 7A shows the torque transfer pin 240 moved to a position radially outward to the outer end 224a of the slot 222a to a high stiffness configuration within the radial travel paths 211, cam profiles 231a/231b, and slots 222a/222b. FIG. 7B shows the torque transfer pin 240 moved to a position radially inward to the inner end 225b of the slot 222b to a low stiffness configuration within the radial travel paths 211, cam profiles 231a/231b, and slots 222a/222b.

Through these operations, the torque coupler enables a theoretical ratio between the stiffness at its highest (stiffest) and at its lowest (softest) up to or greater than 1,000.

Alternatively, in embodiments wherein the cantilever beams have open ends oriented away from the center of the variable torque plate, the closer to the axis 10 the torque transfer pins are, the higher the spring stiffness. As such, in this alternative configuration, the maximum stiffness configuration would comprise the torque transfer pins being positioned in the most radially inward position within the radial travel paths of the rigid torque plate, cam profiles of the torque pin cam plate, and slots of the variable torque plate. Additionally, the low stiffness configuration in this embodiment would comprise the torque transfer pins being positioned in a position radially outward from the maximum stiffness position within the radial travel path of the rigid torque plate, cam profiles of the torque pin cam plate, and slots of the variable torque plate.

The torque coupler described and depicted herein can advantageously be used in the field of robotics, for example as a series elastic actuator (SEA), for use in collaborative robotics (i.e. where a robot is used in collaboration with a worker), and in fields where force compliance has a need for a torque coupling with a variable torsional spring constant/stiffness (e.g., in force control modes of operation, such as, drilling, milling, assembling, clamping, etc.). The torque coupler advantageously provides for variable torsional spring constant/stiffness that can be controlled via a servo motor or other drive device. The torque coupler can advantageously be provided with the ability to measure the transmitted torque within the coupling to provide torque transmission feedback.

The torque coupler herein can advantageously provide a simple, compact, and low cost configuration, and a cylindrical configuration that facilitates easy deployment into existing robot configurations with minimal modifications. The torque coupler herein easily provides the ability to customize for various stiffness ranges (including ratios) and joint rotations, and can provide analytical hi/low stiffness ratios of greater than 10,000. The cam plate, which is used to drive the torque pins, is configured so the pin radial location is proportional to the cam angular position, which provides for simplified pin location control.

Embodiments of the torque coupler include a rigid torque plate that holds torque transfer pins in an axial direction, while allowing the torque transfer pins to move in a radial direction. A variable torque plate is provided that contains one or more active spring features (e.g., flexible beams, such as cantilever beams), which provide the variable torsional stiffness. A cam plate is provided that includes cam slots that control the radial location of the torque transfer pins, which in turn causes the stiffness variation. The torque transfer pins provide a mechanical link between the rigid and variable torque plates. An axial drive coupler is provided for the cam plate to control axial rotation of the cam plate. Also, a sensor, such as a strain gage, can be provided for torque transmission feedback. Alternatively, one or more sensors between the rigid torque plate and the variable torque plate can detect deflections and this provide feedback for positional control.

The torque coupler herein advantageously provides one or more flexible members in the variable torque plate, such as cantilever beams, that interact with torque transfer pins to provide variable spring constant/stiffness values. For example, as the torque transfer pins radial location varies, their location on the cantilever beams vary, thereby providing a variable spring constant/stiffness value. In certain embodiments, a free end of the cantilever beam is provided toward the axial center such that, as the pin radial distance decreases, the spring stiffness decreases. Alternatively, the variable torque plate could be configured with cantilever beams having free ends away from the axial center such that, as the pin radial distance increases, the spring stiffness decreases. The torque is transmitted between the rigid torque plate and the variable torque plate via the torque transfer pins, and the pin locations are controlled by the cam plate, which can be configured to provide a proportional relationship between the cam plate angle and pin radial location. Strain gages can advantageously mounted on, or incorporated in the cantilever beams to provide feedback to a control system regarding beam deflections, and thus torque transmission. Alternatively, one or more sensors between the rigid torque plate and the variable torque plate can detect deflections and this provide feedback for positional control.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention can be practiced otherwise than as specifically described herein.

What is claimed is:

1. A torque coupler for coupling a first member and a second member, said torque coupler comprising:
   a first torque plate configured to attach to the first member, the first torque plate having a first slot extending in a radial direction;
   a second torque plate configured to attach to the second member, the second torque plate having a second slot extending in the radial direction, the second slot having a first side formed of a first flexible beam;
   a cam plate pivotable about an axis, the cam plate having a first cam slot having a first portion provided at a first radial distance from the axis and a second portion provided at a second radial distance from the axis, the second distance being greater than the first distance;
   a first torque transfer member being slidably received within the first slot, the second slot, and the first cam slot, the first torque transfer member being configured to transfer torque between the first torque plate and the second torque plate; and a drive device configured to rotate the cam plate about the axis, wherein rotation of the cam plate about the axis causes the first cam slot to radially slide the first torque transfer member along the first flexible beam.

2. The torque coupler according to claim 1, further comprising a sensor configured to measure relative rotation of the first torque plate and the second torque plate about the axis.

3. The torque coupler according to claim 1, further comprising a sensor configured to determine torque transmission between the first torque plate and the second torque plate.

4. The torque coupler according to claim 1, further comprising a strain gage provided on the first flexible beam to measure strain on the first flexible beam due to torque transferred between the first torque plate and the second torque plate by the torque transfer member.

5. The torque coupler according to claim 1, wherein the first flexible beam extends in a substantially radial direction.

6. The torque coupler according to claim 1, wherein the second slot of the second torque plate has a second side formed of a second flexible beam, the second side being disposed opposite to the first side.

7. The torque coupler according to claim 1, wherein the first flexible beam is a cantilever beam having a fixed end provided at an outer periphery of the second torque plate and a non-fixed end at an inner periphery of the second torque plate.

8. The torque coupler according to claim 7,
wherein the torque coupler is in a high stiffness orientation when the cam plate is rotated such that the first torque transfer member is adjacent the fixed end of the first flexible beam, and
wherein the torque coupler is in a low stiffness orientation when the cam plate is rotated such that the first torque transfer member is adjacent the non-fixed end of the first flexible beam.

9. The torque coupler according to claim 1,
wherein the second slot has a second side formed of a second flexible beam,
wherein the first flexible beam has a fixed end provided at an outer periphery of the second torque plate and an inner end at an inner periphery of the second torque plate,
wherein the second flexible beam has a fixed end provided at the outer periphery of the second torque plate and an inner end at the inner periphery of the second torque plate, and
wherein the inner end of the first flexible beam is joined to the inner end of the second flexible beam such that the second slot forms a closed slot.

10. The torque coupler according to claim 1, wherein the first cam slot has a spiral shape from the first portion to the second portion.

11. The torque coupler according to claim 1, further comprising a second torque transfer member,
wherein the first torque plate has a third slot extending in a direction opposite to the first slot,
wherein the second torque plate has a fourth slot extending in a direction opposite to the second slot, the fourth slot having a second side formed of a second flexible beam,
wherein the cam plate has a second cam slot having a same shape as the first cam slot, the second cam slot being provided on an opposite side of the cam plate about the axis from the first cam slot,
wherein the second torque transfer member is slidably received within the third slot, the fourth slot, and the second cam slot, the second torque transfer member being configured to transfer torque between the first torque plate and the second torque plate, and
wherein rotation of the cam plate about the axis causes the second cam slot to radially slide the second torque transfer member along the second flexible beam.

12. The torque coupler according to claim 1, further comprising a drive coupler attached to the cam plate,
wherein the drive device is configured to rotate the drive coupler to rotate the cam plate about the axis.

13. The torque coupler according to claim 1,
wherein the cam plate includes gear teeth about an outer periphery thereof, and
wherein the drive device is configured to engage the gear teeth to rotate the cam plate about the axis.

14. The torque coupler according to claim 1, wherein the first torque plate is positioned between the second torque plate and the cam plate along the axis.

15. The torque coupler according to claim 1, wherein the cam plate is positioned between the first torque plate and the second torque plate along the axis.

16. A torque coupler for coupling a first member and a second member, said torque coupler comprising:
a first torque plate configured to attach to the first member, the first torque plate having a plurality of first slots extending in radial directions;
a second torque plate configured to attach to the second member, the second torque plate having a plurality of second slots extending in directions corresponding to the plurality of first slots, the plurality of second slots each having at least one side formed of a flexible beam;
a cam plate pivotable about an axis, the cam plate having a plurality of cam slots each extending outwardly from the axis from a first location at a first radial distance to a second location at a second radial distance from the axis;
a plurality of torque transfer members each being slidably received within a respective first slot of the plurality of first slots, a respective second slot of the plurality of second slots, and a respective cam slot of the plurality of cam slots, the plurality of torque transfer members being configured to transfer torque between the first torque plate and the second torque plate; and
a drive device configured to rotate the cam plate about the axis,
wherein rotation of the cam plate about the axis causes the plurality of cam slots to radially slide the torque transfer members along respective flexible beams.

17. The torque coupler according to claim 16, wherein the radial position of the torque transfer members along the respective flexible beams determines a stiffness value of the torque coupler when transferring torque between the first torque plate and the second torque plate.

18. The torque coupler according to claim 16, further comprising a sensor configured to measure relative rotation of the first torque plate and the second torque plate about the axis.

19. The torque coupler according to claim 16, further comprising a sensor configured to determine torque transmission between the first torque plate and the second torque plate.

20. The torque coupler according to claim 16, further comprising a strain gage provided on one or more of the flexible beams to measure strain due to torque transferred between the first torque plate and the second torque plate by the torque transfer member.

21. The torque coupler according to claim 16, wherein the flexible beam extends in a substantially radial direction.

22. The torque coupler according to claim 16, wherein the plurality of second slots each have two opposite sides formed of flexible beams.

23. The torque coupler according to claim 16, wherein the flexible beams are each a cantilever beam having a fixed end provided at an outer periphery of the second torque plate and a non-fixed end at an inner periphery of the second torque plate.

24. The torque coupler according to claim 23,
wherein the torque coupler is in a high stiffness orientation when the cam plate is rotated such that the torque transfer members are adjacent the fixed end of the respective flexible beam, and
wherein the torque coupler is in a low stiffness orientation when the cam plate is rotated such that the torque transfer members are adjacent the non-fixed end of the respective flexible beam.

25. The torque coupler according to claim 16, wherein the plurality of cam slots each have a spiral shape.

26. A method of torque coupling using a torque coupler for coupling a first member and a second member, the method comprising:
providing a first torque plate of the torque coupler, the first torque plate being configured to attach to the first member, the first torque plate having a plurality of first slots extending in radial directions;
providing a second torque plate of the torque coupler, the second torque plate being configured to attach to the second member, the second torque plate having a plurality of second slots extending in directions corresponding to the plurality of first slots, the plurality of second slots each having at least one side formed of a flexible beam;
providing a cam plate of the torque coupler, the cam plate being pivotable about an axis, the cam plate having a plurality of cam slots each extending outwardly from the axis from a first location at a first radial distance to a second location at a second radial distance from the axis;
providing a plurality of torque transfer members of the torque coupler, the plurality of torque transfer members each being slidably received within a respective first slot of the plurality of first slots, a respective second slot of the plurality of second slots, and a respective cam slot of the plurality of cam slots, the plurality of torque transfer members being configured to transfer torque between the first torque plate and the second torque plate; and
driving the cam plate in rotation about the axis to cause the plurality of cam slots to radially slide the torque transfer members along respective first flexible beams to vary a stiffness value of the torque coupler when transferring torque between the first torque plate and the second torque plate.

27. The method according to claim 26, further comprising measuring relative rotation of the first torque plate and the second torque plate about the axis.

28. The method according to claim 26, further comprising determine torque transmission between the first torque plate and the second torque plate.

29. The method according to claim 26, further comprising measuring strain on one or more of the flexible beams due to torque transferred between the first torque plate and the second torque plate by the torque transfer member.

30. The method according to claim 26, wherein the flexible beam extends in a substantially radial direction.

31. The method according to claim 26, wherein the plurality of second slots each have two opposite sides formed of flexible beams.

32. The method according to claim 26, wherein the flexible beams are each a cantilever beam having a fixed end provided at an outer periphery of the second torque plate and a non-fixed end at an inner periphery of the second torque plate.

33. The method according to claim 32,
wherein the torque coupler is in a high stiffness orientation when the cam plate is rotated such that the torque transfer members are adjacent the fixed end of the respective flexible beam, and
wherein the torque coupler is in a low stiffness orientation when the cam plate is rotated such that the torque transfer members are adjacent the non-fixed end of the respective flexible beam.

* * * * *